(12) United States Patent
De Jong et al.

(10) Patent No.: US 6,940,670 B2
(45) Date of Patent: Sep. 6, 2005

(54) METHOD OF READING MAGNETIC INFORMATION WHICH IS IMMUNIZED AGAINST THERMAL ASPERITIES

(75) Inventors: Gerben Willem De Jong, Eindhoven (NL); Johannes Otto Voorman, Eindhoven (NL); Joao Nuno Vila Lobos Ramalho, Algueirao Mem-Martins (PT); Giuseppe Grillo, Eindhoven (NL); Hugo Veenstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 728 days.

(21) Appl. No.: 09/914,244

(22) PCT Filed: Dec. 27, 2000

(86) PCT No.: PCT/EP00/13232

§ 371 (c)(1),
(2), (4) Date: Aug. 24, 2001

(87) PCT Pub. No.: WO01/50462

PCT Pub. Date: Jul. 12, 2001

(65) Prior Publication Data

US 2002/0159175 A1 Oct. 31, 2002

(30) Foreign Application Priority Data

Dec. 29, 1999 (FR) .............................................. 99 16676

(51) Int. Cl.[7] .............................................. G11B 5/02
(52) U.S. Cl. .............................. 360/25; 360/53; 360/46
(58) Field of Search ............................... 360/25, 53, 46, 360/67, 66

(56) References Cited

U.S. PATENT DOCUMENTS

| 5,818,656 A | 10/1998 | Klaassen et al. | |
| 5,834,969 A | 11/1998 | Umeyama et al. | |
| 5,847,890 A | 12/1998 | Hattori | |
| 6,005,726 A | 12/1999 | Tsunoda | |
| 6,381,082 B1 * | 4/2002 | Voorman et al. | 360/25 |
| 6,400,518 B1 * | 6/2002 | Bhaumik et al. | 360/25 |

FOREIGN PATENT DOCUMENTS

| EP | 0439299 A2 | 1/1991 |
| EP | 1003155 A1 | 5/2000 |

OTHER PUBLICATIONS

K. B. Klaassen, J. C. L. van Peppen, "Electronic Abatement of Thermal Interference in (G) MR Head," IEEE Transactions On Magnetics, US, IEEE Inc., N.Y., May 9, 1997, pp. 2611–2616–2616.

* cited by examiner

Primary Examiner—Alan T. Faber
(74) Attorney, Agent, or Firm—Peter Zawilski

(57) ABSTRACT

The invention relates to a method of reading of magnetic information. In an example embodiment, a read head includes a magneto-resistive rod polarized with an electrical signal. The magneto-resistive rod supplies a data signal whose variations are representative of magnetic-field variations to which the read head is exposed. Included in the embodiment, there is a compression of the data signal triggered when a thermal asperity is detected.

9 Claims, 2 Drawing Sheets

Figure 1:
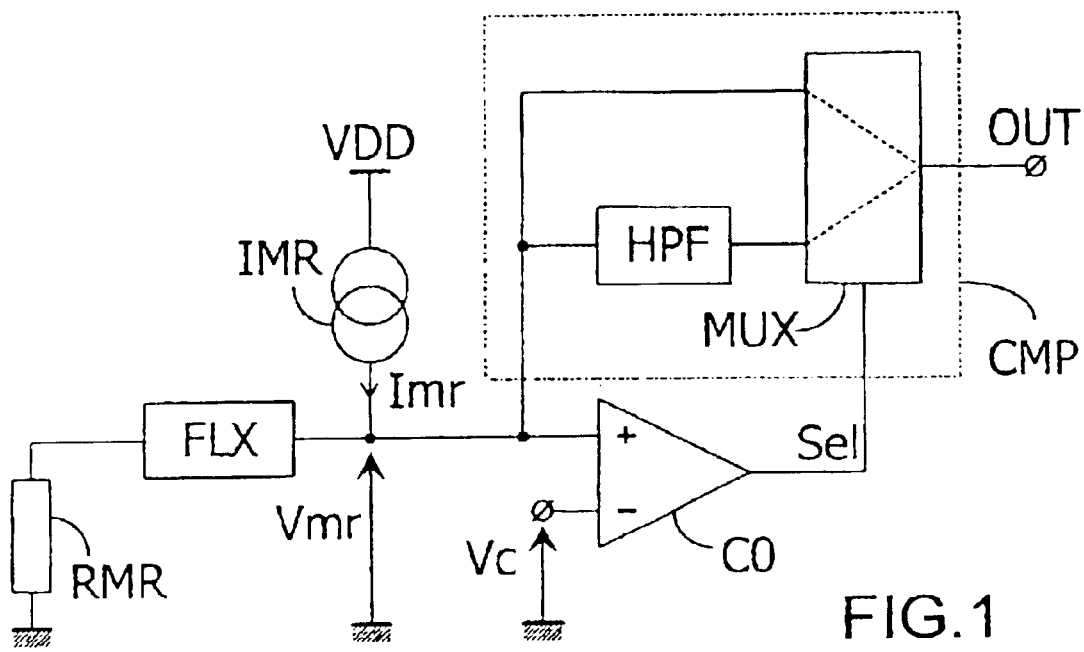

METHOD OF READING MAGNETIC INFORMATION WHICH IS IMMUNIZED AGAINST THERMAL ASPERITIES

The invention relates to a method of reading magnetic information by means of a read head, which is to be placed proximate to a support at the surface of which information is stored, which read head includes a magneto-resistive rod which is to be polarized by means of an electric signal of constant value and which serves to supply a data signal whose variations are representative of the magnetic-field variations to which the read head is exposed.

Such methods are customarily employed in the electronics industry, particularly in readers of hard discs used in the field of informatics. In these systems, a disc carrying magnetic information is driven to rotation, while the read head is made to move in a radial direction with respect to the disc, the distance between said disc and said read head being very small. The information stored on such discs consist of a vast number of local magnetic fields, which can be polarized in two different directions depending on whether they represent a binary 1 or a binary 0. As the resistance of the magneto-resistive rod depends upon the magnetic field wherein it is inserted, said resistance and hence the data signal exhibit variations when the read head moves over the surface of the disc, which variations are representative of differences between the local magnetic fields present on the disc surface.

As the distance between the read head and the disc surface is very small, the read head sometimes collides with a foreign body present between the read head and the disc surface, or with an asperity present at the surface of the disc itself. Such occurrences are referred to as "thermal asperities", because they cause a sudden increase in temperature of the magneto-resistive rod, which increase in temperature causes a sharp increase of the resistance of the magneto-resistive rod, and hence the introduction of an additional component in the data signal, thereby causing an important increase of the instantaneous value of the latter. For the reader's information: the amplitude of the additional component generated by a thermal asperity may range from 25 to 200% of the nominal amplitude of the data signal variations during normal operating conditions. The effect of a thermal asperity increases with the violence of the impact of the collision between the read head and the foreign body or the asperity.

Generally, the data signal is amplified before it is processed. For this purpose, use is made of an amplifier which is optimized for treating signals exhibiting a nominal variation amplitude. A sharp increase in the value of the data signal caused by a thermal asperity may lead to saturation, perhaps even damage, of the amplifier. In either case, a loss of information will be inevitable, which cannot be accepted.

Therefore, it is an object of the invention to overcome these drawbacks by providing a method of reading magnetic information, enabling the effects of thermal asperity on the data signal to be substantially reduced.

Indeed, in accordance with the invention, a method as described in the opening paragraph includes a data signal-compression step which is triggered off when a thermal asperity is detected.

The compression of the data signal enables the additional component introduced into the signal by the sharp increase of the resistance of the magneto-resistive rod to be eliminated to a large extent, and the amplitude of the variations of said signal to be maintained at the nominal amplitude, thereby preserving the amplifier which serves to receive the data signal. Said compression takes place only when a thermal asperity is effectively detected, thereby precluding that the data signal is needlessly subjected to a noise-generating compression step under normal operating conditions.

In an embodiment in accordance with the invention, the value of the data signal is compared with a predetermined threshold value, the result of said comparison either inhibiting or triggering off the compression step.

Such a comparison enables thermal asperities to be detected by using simple means. The threshold value determines a threshold beyond which the effects of thermal asperities are taken into account. Said threshold value thus defines the degree of significance of the thermal asperity. A thermal asperity tolerance threshold can be determined by adjusting the threshold value.

In a particular embodiment of the invention, the compression step consists in subjecting the data signal to high-pass filtering.

The frequency of the variations of the data signal is much higher than the frequency of the additional component introduced into the signal by the thermal asperity. To a certain degree, this additional component may even be considered to be a DC-component. The above-mentioned high-pass filtering thus constitutes an efficient, low-cost compression means.

In one of its embodiments, the invention relates to a device for reading magnetic information, comprising:

a read head, which is to be placed proximate to a support at the surface of which information is stored, which read head comprises a magneto-resistive rod, which is to be polarized by means of a constant electrical signal, and which serves to supply a data signal whose variations are representative of magnetic field variations to which the read head is exposed, detection means for detecting a thermal asperity, and compression means for compressing the data signal, which are to be inhibited as long as no thermal asperity is detected.

In a variant of this embodiment, the invention also relates to a reading device as described hereinabove, comprising:

a subtracter, which is provided with a first input intended to receive the data signal, a second input, and an output intended to supply an output signal of the device, a non-linear gain module, intended to receive the data signal at an input, and to supply an output signal, the gain of this module being substantially zero when the absolute value of its input signal is below a predetermined threshold value, and a low-pass filter provided with an input intended to receive the output signal of the non-linear gain module, and with an output connected to the second input of the subtracter.

In another variant, the invention also relates to a reading device as described hereinabove, comprising:

a subtracter, which is provided with a first input for receiving the data signal, a second input, and an output for supplying an output signal of the device, a non-linear gain module, intended to receive the output signal of the device at an input, and to supply an output signal, the gain of said module being substantially zero when the absolute value of its input signal is below a predetermined threshold value, and an integrator, which is provided with an input for receiving the output signal of the non-linear gain module, and with an output connected to the second input of the subtracter.

The two variants described hereinabove are particularly advantageous in that they enable the structure of the detection and compression means to be simplified.

Figure 2:
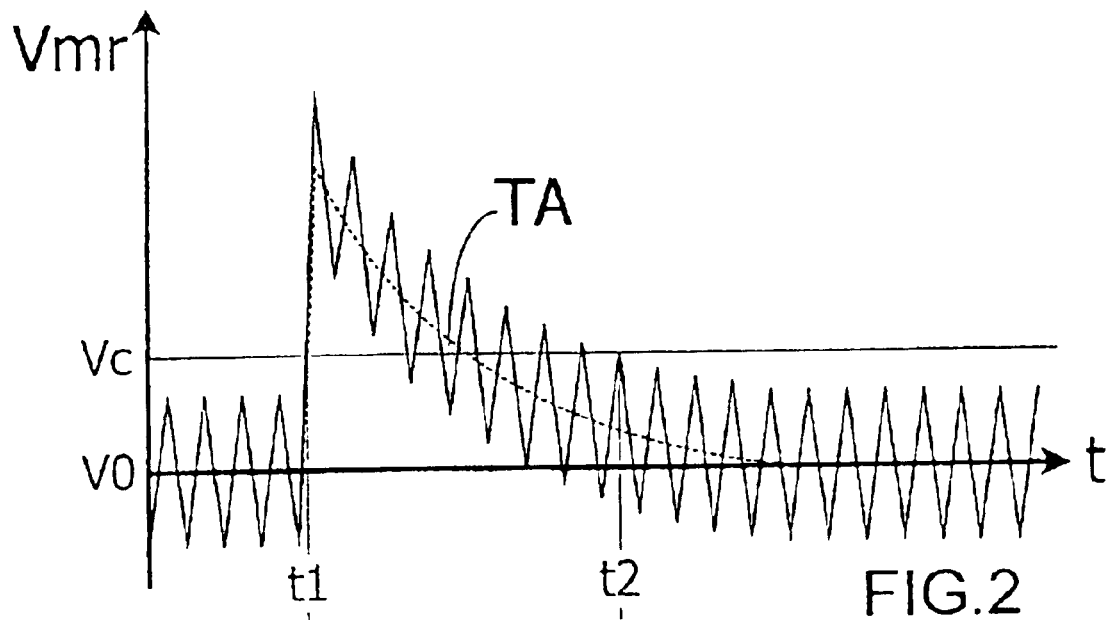
Figure 3:
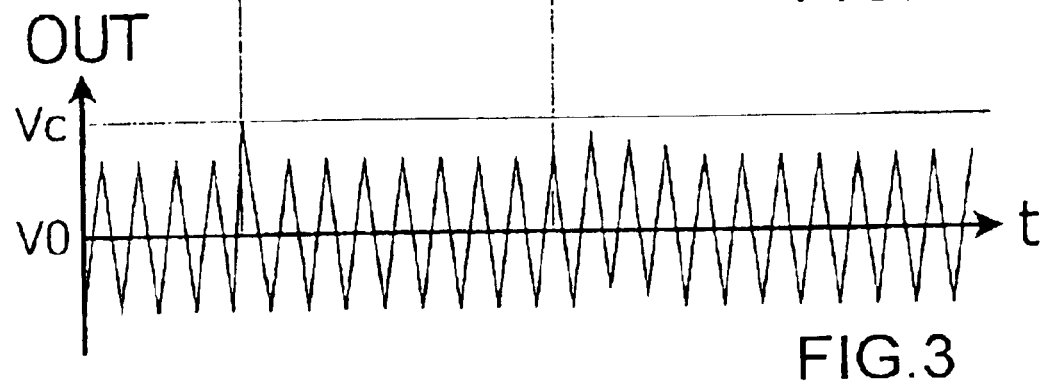
Figure 4:
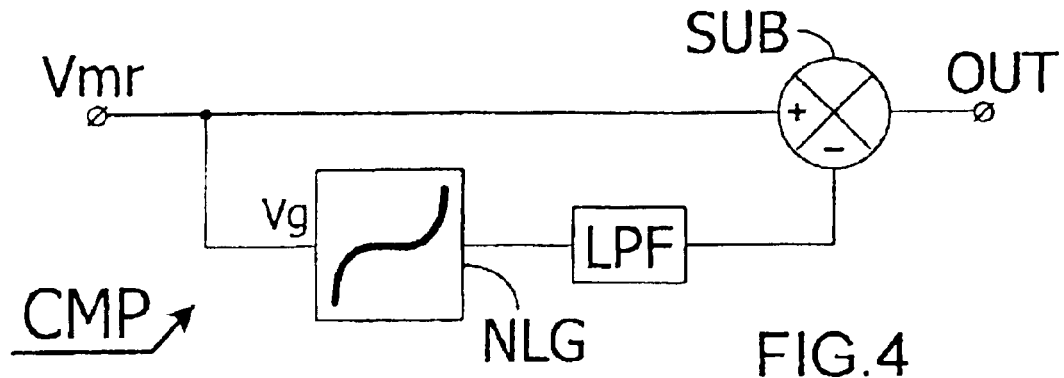
Figure 5:
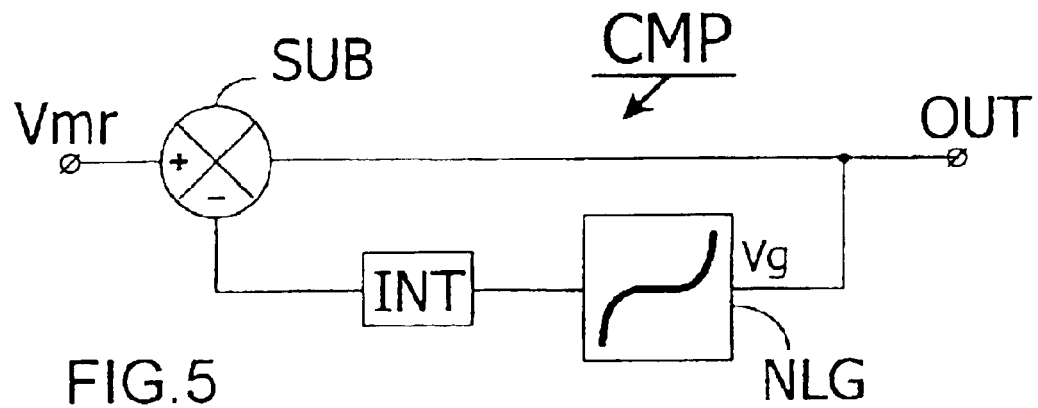
Figure 6:
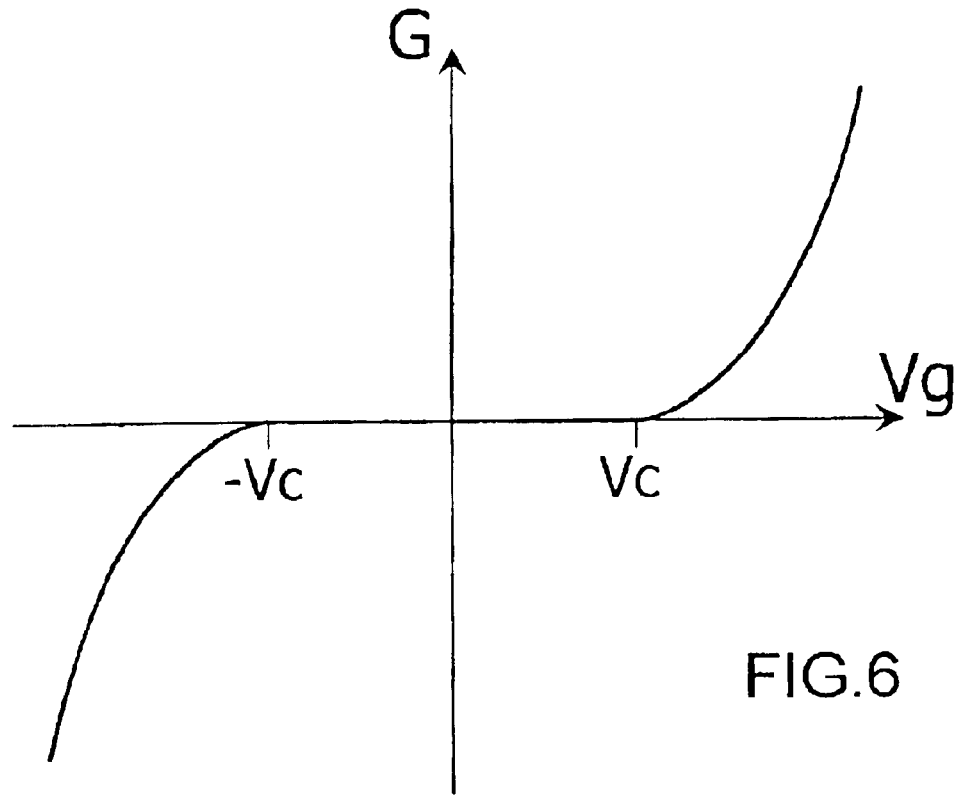

These and other aspects of the invention will be apparent from and elucidated with reference to the non-limitative exemplary embodiment described hereinbelow and the associated drawings, in which:

FIG. 1 is a partial functional diagram of a magnetic information-reading device wherein the invention is embodied, FIG. 2 is a timing diagram showing the course of a data signal present in such a device, FIG. 3 is a timing diagram showing the course of another signal present in such a device, FIG. 4 is a functional diagram of compression means which are utilized in accordance with a variant of the invention, FIG. 5 is a functional diagram of compression means which are utilized in accordance with another variant of the invention, and FIG. 6 is a transfer characteristic of a non-linear gain module used in said variants of the invention.

FIG. 1 diagrammatically shows a read device in accordance with the invention.

This device includes:

a read head, which is to be placed proximate to a support at the surface of which information is stored, which read head comprises a magneto-resistive rod RMR, which is to be polarized by means of a constant electrical signal Imr, and which serves to supply a data signal Vmr whose variations are representative of the magnetic field variations to which the read head is exposed, detection means (Vc, C0) for detecting a thermal asperity, and compression means CMP for compressing the data signal Vmr, which are to be inhibited when no thermal asperity is detected.

In the example described here, a current source is arranged between a supply terminal VDD and a flexible conductor FLX connecting the magneto-resistive rod RMR to the other components of the read device. As the current Imr is constant, the variations in resistance of the magneto-resistive rod RMR caused by the magnetic-field variations to which the read head is exposed generate variations in voltage. In other embodiments of the invention, the magneto-resistive rod may be polarized by means of a constant voltage, in which case the data signal consists of a current that is a copy of the current flowing through the magneto-resistive rod.

The detection means include means for comparing the value of the data signal with a threshold value Vc, which comparison means are formed by a comparator C0, which receives the data signal Vmr at a non-inverting input and a signal having the threshold value Vc at an inverting input. An output of the comparator C0 supplies a control signal Sel, which is representative of the result of such a comparison, and which serves to inhibit or authorize the compression operation, which control signal, in this example, is at a logic level 0 if the value of the data signal is lower than the threshold value Vc, and at a logic level 1 if the value of the data signal is higher than the threshold value Vc, i.e. when a thermal asperity is identified by the detection means.

In the example described here, the compression means CMP include a high-pass filter HPF, intended to filter the data signal Vmr, and a multiplexer MUX, which is provided with a data input for receiving the data signal Vmr, with another data input connected to an output of the high-pass filter HPF, and with a selection input for receiving the control signal Sel.

By virtue of the invention, the multiplexer MUX supplies an output signal OUT, which is representative of the variations of the data signal Vmr, but which is free of any additional component which would be introduced by a thermal asperity into said signal, without being altered by a noise-generating systematic compression.

FIGS. 2 and 3 clearly show these advantages: under normal operating conditions, i.e in this example before t=t1, the data signal Vmr exhibits oscillations around a constant value V0, which is equal to R0.Imr, R0 being the resistance of the magnetoresistive rod when it is not subjected to any magnetic field in particular, the flexible conductor FLX exhibiting only a negligibly small resistance. The oscillations are representative of local magnetic field variations to which the read head is exposed when it is being moved with respect to the support on which the magnetic information is stored. The frequency of the oscillations of the data signal Vmr is in fact much higher than the frequency which has been chosen here in order to improve the readability of the FIGS. 2 and 3. The variations of the data signal Vmr are such that its instantaneous value does not exceed the threshold value Vc. The control signal Sel then is at the logic level 0 and the multiplexer MUX directs the data signal Vmr towards its output, which data signal constitutes the output signal OUT and is not altered by a compression operation, which is unnecessary under normal operating conditions.

When, at t=t1, a thermal asperity occurs, this asperity introduces an additional component TA, represented by dotted lines in FIG. 2, into the data signal, thereby causing a sharp increase of the value of the data signal Vmr. The thermal asperity is detected by the detection means when the value of the data signal Vmr exceeds the threshold value Vc, which has been chosen to be, in this case, 25% higher than the nominal amplitude of the oscillations of the data signal Vmr under normal operating conditions. As a result, the control signal Sel switches to the logic level 1, and the multiplexer MUX replaces the data signal Vmr with the output signal of the high-pass filter HPF in order to form the output signal OUT. The Figures clearly show that the additional component TA introduced by the thermal asperity can be considered to be a DC-component with respect to the oscillations of the data signal Vmr. This DC-component is filtered by the high-pass filter HPF, which, on the other hand, remains transparent to the oscillations caused by magnetic-field variations to which the read head is exposed. Thus, only a minor perturbation of these oscillations in the output signal OUT occurs, which is caused by the increase of the value of the data signal Vmr prior to the instant t=t1, at which the detection means have effectively identified the thermal asperity.

The additional component subsequently decreases approximately exponentially as a result of progressive cooling down of the magneto-resistive rod. After t=t2, the instantaneous value of the data signal Vmr again becomes smaller than the threshold value Vc, and the control signal Sel returns to the logic level 0, and the multiplexer MUX again directs the data signal Vmr towards its output, which data signal Vmr then constitutes the output signal OUT. A minor perturbation of the output signal OUT is observed between the instant t2 and the instant at which the additional component TA effectively becomes zero, in which interval the maximum value of the output signal is higher than the maximum value under normal operating conditions, but the difference is so small that an amplifier receiving this OUT signal is insensible thereto. Thus, the compression only effectively takes place in the interval [t1; t2] in which a thermal asperity is detected. Outside this interval, the output signal OUT is formed by the data signal Vmr itself and hence is free from any alteration.

FIGS. 4 and 5 are block diagrams showing different embodiments of the compression means CMP. These variants take advantage of the fact that a high-pass filter can be considered to carry out a subtraction between the signal to be filtered and the low-frequency component of this signal.

Thus, in a first variant described with reference to FIG. 4, the compression means CMP include:

a subtracter SUB provided with a first input for receiving the data signal Vmr, a second input, and an output for supplying an output signal OUT of the device, a non-linear gain module NLG for receiving the data signal Vmr at an input, and for supplying an output signal, the gain of this module NLG being substantially zero when the absolute value of its input signal Vg is below the threshold value Vc, and a low-pass filter LPF provided with an input for receiving the output signal of the non-linear gain module NLG, and with an output, which is connected to the second input of the subtracter SUB.

In a second variant as described with reference to FIG. 5, the compression means CMP include:

a subtracter SUB provided with a first input for receiving the data signal Vmr, a second input, and an output for supplying an output signal OUT of the device, a non-linear gain module NLG for receiving the output signal OUT of the device at an input, and for supplying an output signal, the gain of said module NLG being substantially zero when the absolute value of its input signal is below the threshold value Vc, and an integrator INT provided with an input for receiving the output signal of the non-linear gain module NLG, and with an output, which is connected to the second input of the subtracter SUB.

The two variants shown in FIGS. 4 and 5 are advantageous in that they enable the detection means to be incorporated in the compression means, the function of detection means then being performed is ensured by the non-linear gain module NLG. Indeed, as long as the value of the data signal Vmr is below the threshold value, the gain of this module NLG is substantially zero, which means that the output signal OUT is formed by the data signal Vmr, with the subtracter SUB receiving a zero signal at its second input. When the value of the data signal Vmr exceeds the threshold value Vc. i.e., with reference to FIGS. 2 and 3 which are also representative of the functioning of the compression means described by means of FIGS. 4 and 5, when a thermal asperity is detected at t=t1, the low-frequency content of the data signal Vmr or of the output signal OUT, i.e. the additional component TA, is extracted by the low-pass filter LPF or by the integrator INT, respectively, and subtracted from the data signal Vmr. In both cases, the output signal OUT is freed of the additional component TA, the compression thus performed only occurring when the existence of such an additional component is detected, yet without necessitating the implementation of comparators or multiplexers.

FIG. 6 diagrammatically shows the shape of a transfer characteristic of a non-linear gain module used in the variants of the invention described hereinabove. When the absolute value of an input signal Vg is below the threshold value Vc, the gain of this module is zero, thus enabling the compression means to be activated only when a thermal asperity occurs.

What is claimed is:

1. A method of reading magnetic information by means of a read head, which is to be placed proximate to a support at the surface of which information is stored, which read head includes a magneto-resistive rod which is to be polarized by means of an electric signal of constant value and serves to supply a data signal whose variations are representative of the magnetic-field variations to which the read head is exposed, which method includes a data signal compression step which is triggered off when a thermal roughness is detected.

2. A method as claimed in claim 1, wherein the value of the data signal is compared with a predetermined threshold value, the result of said comparison either inhibiting or triggering off the compression step.

3. A method as claimed in claim 1, wherein the compression step consists in subjecting the data signal to high-pass filtering.

4. A device for reading magnetic information, comprising:

a read head, which is to be placed proximate to a support at the surface of which information is stored, which read head comprises a magneto-resistive rod, which is to be polarized by means of a constant electrical signal and serves to supply a data signal whose variations are representative of magnetic field variations to which the read head is exposed, detection means for detecting a thermal asperity, and compression means for compressing the data signal, which are to be inhibited as long as no thermal asperity is detected.

5. A read device as claimed in claim 4, wherein the detection means include means for comparing the data signal value with a predetermined threshold value, which comparison means are intended to supply a control signal which is representative of the result of such a comparison and which serves to inhibit or authorize the compression operation.

6. A read device as claimed in claim 5, wherein the compression means include a high-pass filter.

7. A read device as claimed in claim 6, wherein the compression means additionally include a multiplexer, which is provided with a data input for receiving the data signal, with another data input which is connected to an output of the high-pass filter, and with a selection input for receiving the control signal.

8. A read device as claimed in claim 4, comprising:

a subtracter, which is provided with a first input intended to receive the data signal, a second input, and an output intended to supply an output signal of the device, a non-linear gain module, intended to receive the data signal at an input, and to supply an output signal, the gain of this module being substantially zero when the absolute value of its input signal is below a predetermined threshold value, and a low-pass filter provided with an input intended to receive the output signal of the nonlinear gain module, and with an output connected to the second input of the subtracter.

9. A read device as claimed in claim 4, comprising:

a subtracter, which is provided with a first input for receiving the data signal, a second input, and an output for supplying an output signal of the device, a non-linear gain module, intended to receive the output signal of the device at an input, and to supply an output signal, the gain of said module being substantially zero when the absolute value of its input signal is below a predetermined threshold value, and an integrator, which is provided with an input for receiving the output signal of the non-linear gain module, and with an output connected to the second input of the subtracter.

* * * * *